United States Patent [19]

Otani

[11] Patent Number: 6,144,403
[45] Date of Patent: Nov. 7, 2000

[54] IMAGE PROCESSING APPARATUS AND IMAGE PROCESSING SYSTEM

[75] Inventor: Masatoshi Otani, Yokohama, Japan

[73] Assignee: Canon Kabushiki Kaisha, Tokyo, Japan

[21] Appl. No.: 08/685,461

[22] Filed: Jul. 24, 1996

[30] Foreign Application Priority Data

Jul. 31, 1995 [JP] Japan .................................. 7-194994

[51] Int. Cl.[7] .............................. H04N 7/14; H04N 1/04; G03B 13/00
[52] U.S. Cl. ........................ 348/17; 348/347; 348/208; 358/488
[58] Field of Search ............................. 348/14–18, 345, 348/347–349, 356–358, 208, 240, 699, 700, 701, 19–20; 379/100.15, 202; 358/488, 909.1

[56] References Cited

U.S. PATENT DOCUMENTS

| | | | |
|---|---|---|---|
| 4,899,194 | 2/1990 | Hori | 348/356 |
| 5,325,206 | 6/1994 | Fujita et al. | 348/347 |
| 5,355,163 | 10/1994 | Tomitaka | 348/358 |
| 5,357,281 | 10/1994 | Ikeda et al. | 348/15 |
| 5,528,289 | 6/1996 | Cortjens et al. | 348/15 |
| 5,699,113 | 12/1997 | Ohiwa | 348/358 |
| 5,729,290 | 3/1998 | Tokumitsu et al. | 348/349 |
| 5,742,329 | 4/1998 | Masunaga et al. | 348/15 |

*Primary Examiner*—Curtis A. Kuntz
*Assistant Examiner*—George Eng
*Attorney, Agent, or Firm*—Fitzpatrick, Cella, Harper & Scinto

[57] ABSTRACT

An image processing apparatus that eliminates a complicated operation when a document image is input. The apparatus has an image input device for inputting a document image. A detection device detects displacement of the document image input by the input device. A determination device determines the input conditions of the image input device when the displacement detected by the detection device is not greater than a predetermined value. A control device controls the input device based on the input conditions determined by the determination device so as to cause the input device to input the document image.

33 Claims, 13 Drawing Sheets

FIG. 7A
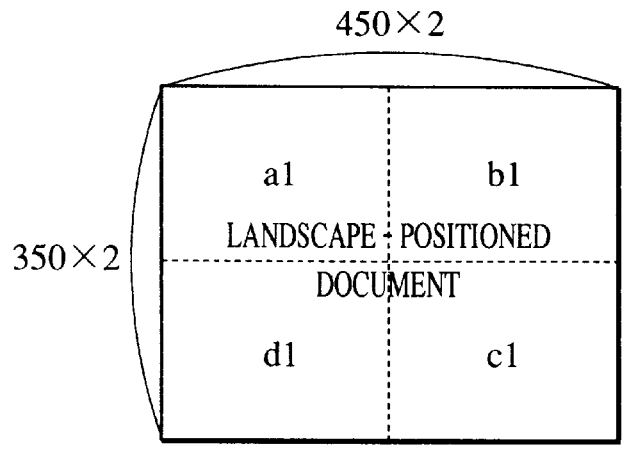
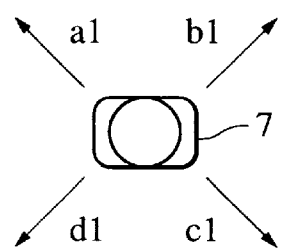
FIG. 7B
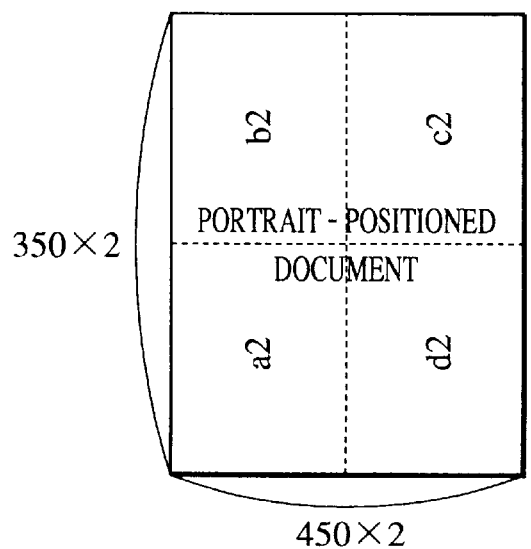
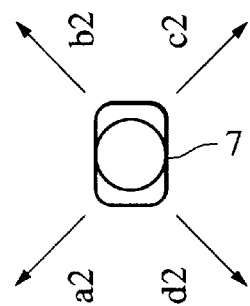

FIG. 8A
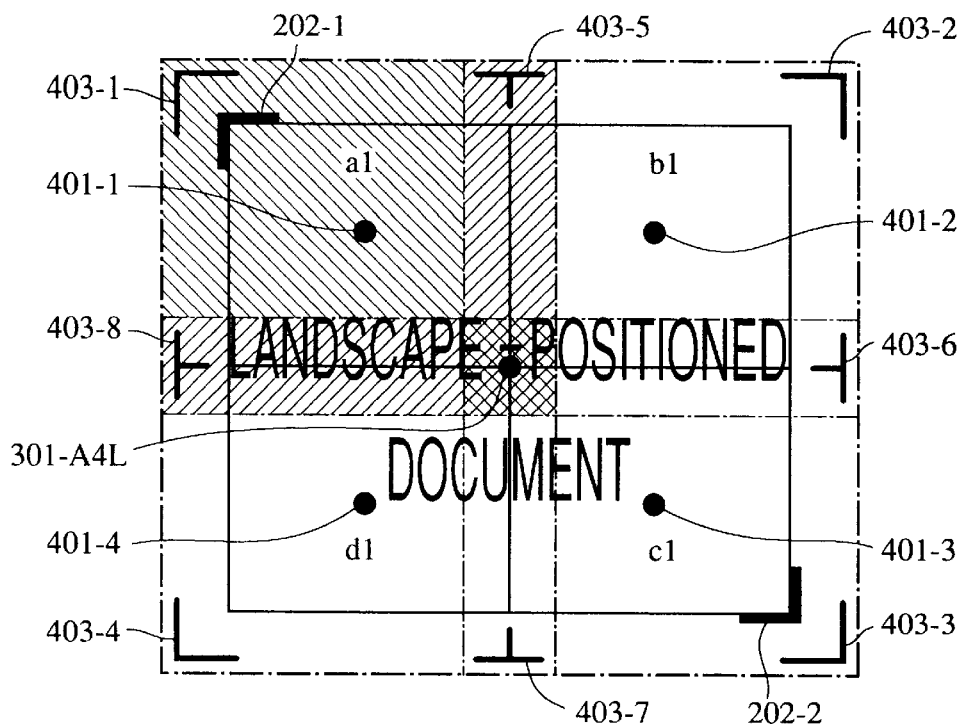
FIG. 8B
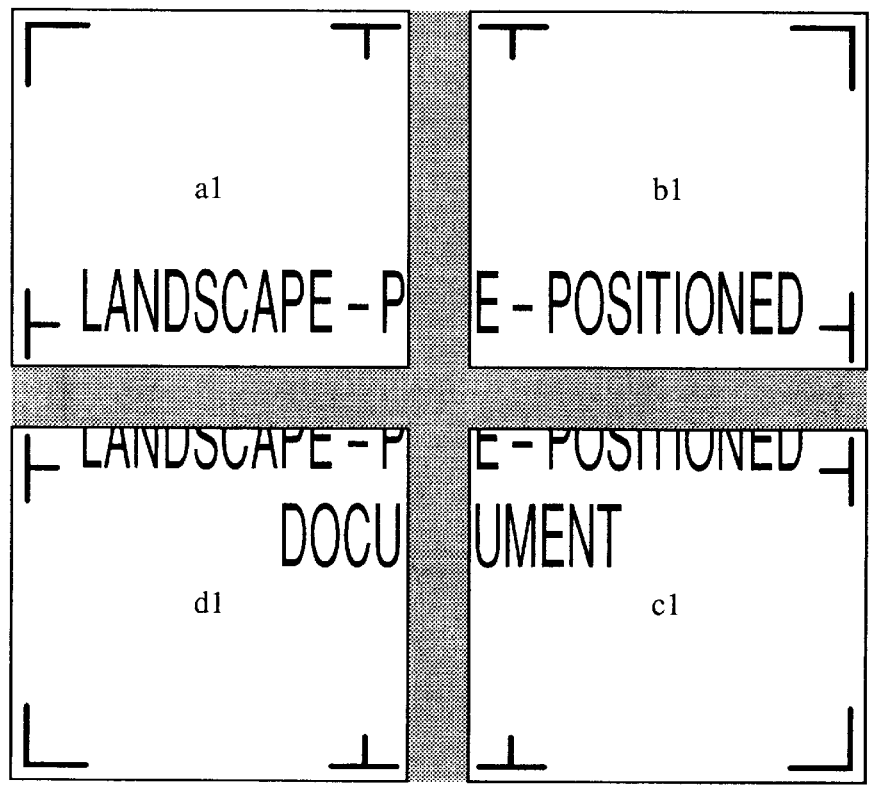

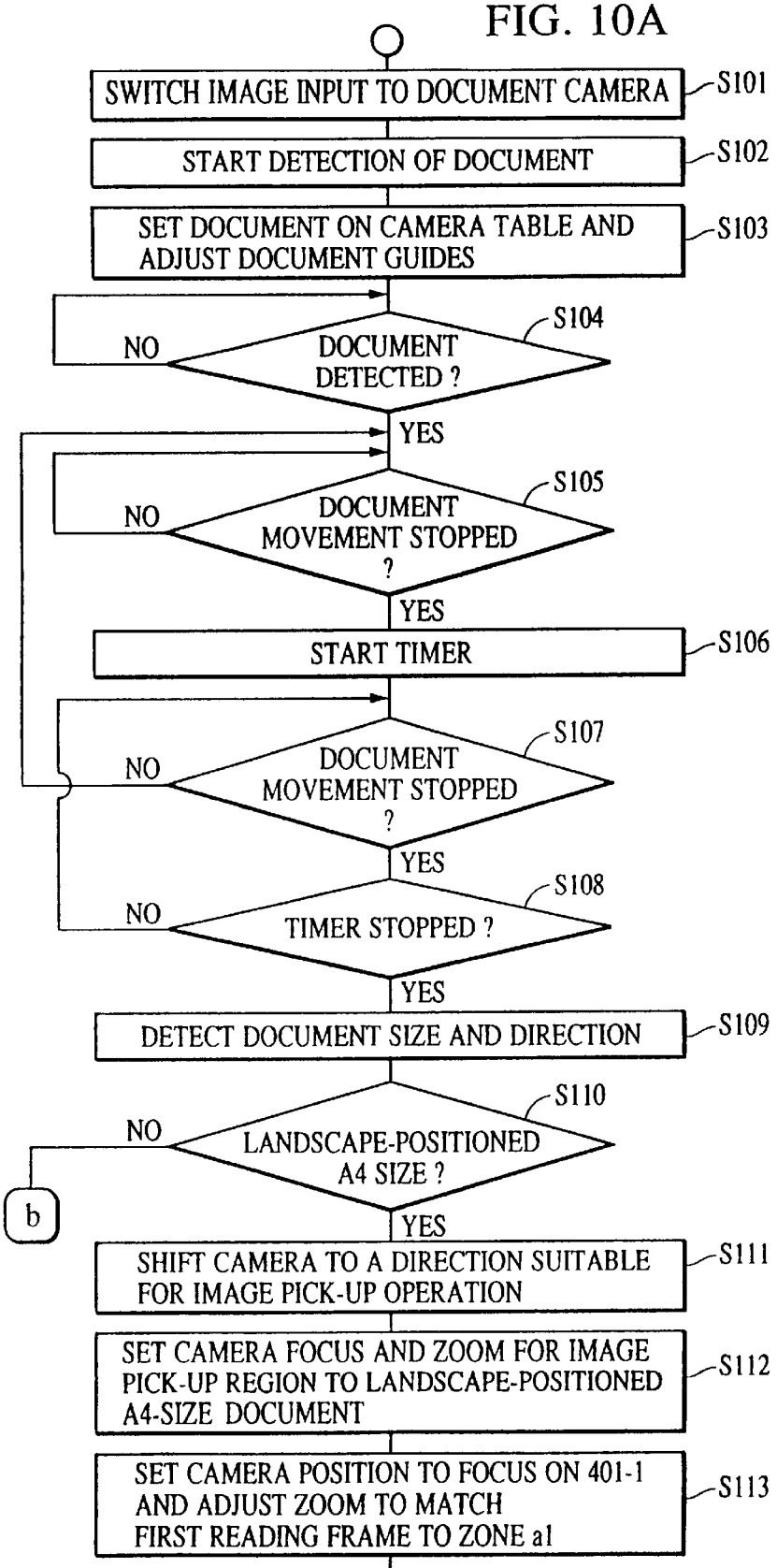

| FIG. 11A | FIG. 11B |

IMAGE PROCESSING APPARATUS AND IMAGE PROCESSING SYSTEM

BACKGROUND OF THE INVENTION

1. Field of the Invention

The present invention relates to an image processing apparatus and an image processing system.

2. Description of the Related Art

As a practical use of communication services using digital lines, such as Integrated Services Digital Network (ISDN) lines, is promoted, multimedia information communications using the above-described digital lines, such as video image information, sound information, data, etc., are implemented. In the International Telecommunications Union-Telecommunication Sector (ITU-TS), services definitions, video image coding methods, multimedia multiplexing structures definitions, protocol definitions, and so on, are recommended as International Telecommunication Union-Telecommunication (ITU-T) recommendations. Additionally, high-speed processors which can sufficiently process video images in real time, compression coding/decoding chips, etc. are becoming less expensive. This further makes it possible to accelerate video image communications.

As a typical known communication apparatus of the above type, a videoconference system is available. Videoconferences and videotelepliones through personal computers (hereinafter referred to as "PCs") and workstations (hereinafter referred to as "WSs") are becoming feasible. As the above-described standards are being further promoted, processors are becoming faster, various; types of image-processing chips are becoming less expensive, and PCs and WSs are becoming more powerful and less expensive.

In a videoconference system, a conference usually proceeds by the following typical communication pattern. In addition to sound information communications, portrait images from both communication ends are coded according to coding algorithms, such as the ITIJ-T recommendation H. 261, using the interframe coding or intra-frame coding method, and are mutually transmitted and received. A conference thus proceeds with the participants observing each other via moving pictures. On the other hand, a camera for picking up a document image, which is referred to as "a document camera", is used to transmit and receive the image, whereby the common document can be displayed on both screens.

In most cases, an actual conference proceeds while observing not only the portrait images but also the common documents shared with both communication ends. Accordingly, there is an increasing demand for an improved method of easily transmitting and receiving a clear and sharp document while a conference is under way. The following methods have been attempted for communicating and displaying documents: directly transmitting and receiving a document produced on a PC or a WS in a videoconference system using a PC or a WS, transmitting and receiving a document read by a scanner, and transmitting and receiving still images that have been incorporated with a still video camera, or the like. However, the above-mentioned methods encounter the problems of incompatibility between PCs or WSs, and complexity of operation. Problems may also arise when it is required that ;sections of the displayed document be pointed to or when the documents must be changed. Further, an extra camera and scanner used for this specific purpose increases the costs. Thus, in realizy, these problems hamper the widespread use of the above-described methods.

Accordingly, a document camera is best used since it can be simply handled and even three-dimensional images can be transmitted and received. Document cameras include a camera specifically used for this purpose and a camera serving to pick up both portrait and document images.

Hitherto, when a document is transmitted with a document camera or in a document camera mode, it is required to be first set under a document camera table or a document camera, and then, the focus and the zoom ratio of the camera are adjusted and the document is positioned while observing a screen that displays the document image picked up by the camera. However, by using an ordinary camera that outputs video image signals according to the NTSC or PAL system, the A4-size overall document primarily including characters can be displayed, but the characters cannot be sufficiently read because of poor resolution. In order to overcome this drawback, the zoom is regulated to sufficiently read the necessary portion of the document set on the camera table or on the camera. A document image is captured as an ordinary signal according to the NTSC or PAL system and is transmitted as a coded moving picture image, in a manner similar to a portrait image. Alternatively, a document image is captured in a manner similar to the above technique, and is coded and transmitted as a still picture image with the operation by the user. In either case, the image is decoded and displayed at a receiving end in a manner similar to a portrait image.

In a typical CCD camera with 380,000 pixel-resolution, which is at present commercially available, the effective resolution for reading and displaying an image is, in general, approximately 450 lines of horizontal resolution and 350 lines of vertical resolution. In other words, the resolution is calculated in terms of a facsimile machine, which is equivalent to approximately 2 pel/mm (approximately 50 dpi) when an image of an A4-size document is taken. Also, monitors used in offices, for e(example, the latest PCs and WSs, with high resolution, such as 1280 by 1024 or 1024 by 768 dots, are becoming less expensive. If an A4-size document is read by a facsimile machine with 200 dpi resolution, 1728 by 2339 dots can be obtained only one half of this resolution, i.e., 100 dpi, equivalent to the resolution of approximately 800 by 1000 dots, is sufficient to display an A4-size document on a high-resolution display monitor. It has been determined that a document read by a scanner with this resolution is legible.

A video image signal according to the NTSC or the PAL method has an aspect ratio of 4:3, and the A4-size document is 210 mm by 297 mm, which is approximately 4:3. However, although a landscape-positioned document matches the NTSC/PAL video signal, a portrait-positioned document having an aspect ratio of 3:4, is inconsistent with the NTSC/PAL video signal.

An attempt has been made to divide an A4-size document into portions and input them, assuming that a satisfactory image can be obtained judging from the above-described resolution. In reality, however, a camera is mechanically moved to input an image, and only a slight document displacement due to the operator's erroneous operation causes a resulting synthesized image to distort at its boundary. Further, it is necessary to change the image-reading methods depending on whether the A4-size document is located in a landscape or portrait position. A camera should also be controlled differently depending on the size of the document, such as A4, B4 or A5. Additionally, the position of moving the camera should vary depending on where the document is located on the document table. Namely, only the user can execute the above-described camera control. On the other hand, in an apparatus that transmits a document as a still image with the use of a document camera, every time the document camera mode and the portrait camera mode are switched, very complicated operations are entailed: such as not only the changing of the camera modes, but also, the switching of video image-coding transmission modes, the document positioning and the starting operation required for capturing still images, etc. Moreover, in an actual conference using this document camera, in most cases, the user makes a presentation while continuously changing the documents. This type of apparatus requires a complicated and troublesome operation for camera control every time the user changes the documents.

The following problems are encountered in the apparatus of the above conventional type that transmits and receives a document as a moving picture. Since an input video image is incorporated as an ordinary video signal according to the NTSC or PAL system, in an office, an overall manual or a document of the A4 size that is produced by a wordprocessor or the like, is not legible, unless it is written in large characters, because of poor resolution. On the other hand, the following problems are presented in an apparatus that transmits and receives a high-resolution still image by dividing the document into portions and synthesizing them. A large mechanism is required to move the overall camera, which increases the cost. Also, there are variations in the types of documents, such as differences in sizes, for example, B4, A5, B5, etc., and differences in orientations, for example, landscape-positioned documents and portrait-positioned documents. Thus, only users can perform these very complicated and troublesome operations. Further, in an actual conference, the user, in general, makes a presentation using a plurality of documents, and accordingly has to frequently change the documents. In a conventional apparatus that codes and transmits a document as a still image, complicated and troublesome operations are required every time the documents are changed. Consquently, it is thus difficult to use such an apparatus without the aid of an operator skilled in the above-described operation. Further, the operator may forget to switch to the portrait mode from the document mode even though there is no document to be transmitted and may be unaware that the image is no longer transmitted to the other end, or a meaningless image of the document table may continue to be transmitted to the other end.

In an apparatus selectively using the interframe coding and the intra-frame coding methods according to a coding algorithm, such as H261 or the like, an input image with less motion is compressed using the interframe coding method, thereby accomplishing the transmission of highly-compressed images.

Hitherto, since a document image is transmitted while the document is still being prepared for image input operation, i.e., before a document becomes still, an unnecessary image that is difficult to identify is transmitted to the receiving end. Further, since such an unnecessary document has a great motion, it is compressed according to the intra-frame coding method. Then the resulting image, which has not been highly compressed, is uselessly transmitted, thereby wasting transmission costs.

Additionally, hitherto, images are always transmitted in real time even after still images are transmitted. Accordingly, only a slight displacement due to the operator's erroneous operation, though the operator does not intend to remove the document, causes an interframe-coded or intraframe-coded image that is actually the same image as the previous image to be transmitted. This also increases transmission costs.

SUMMARY OF THE INVENTION

Accordingly, it is an object of the present invention to provide an image processing apparatus and an image processing system free from the above-described problems.

Another object of the present invention is to provide an image processing apparatus and an image processing system with ease of operation that can achieve the high-resolution image input operation.

In order to achieve the above objects, the present invention provides an image processing apparatus comprising: image input means for inputting a document image; detection means for detecting displacement of the document image input by the image input means; determination means for determining input conditions of the image input means when the displacement detected by the detection means is not greater than a predetermined value; and control means for controlling the image input means, based on the input conditions determined by the determination means, so as to cause the image input means to input the document image.

Still another object of the present invention is to provide an image processing apparatus and an image processing system that can avoid unnecessary image transmission if there is no document data to be transmitted.

A further object of the present invention to provide an image processing apparatus and an image processing system that can prevent meaningless data transmission when a still image, such as a document, is transmitted.

A further object of the present invention to provide an image processing apparatus and an image processing system having a novel feature.

Further objects, features and advantages of the present invention will become apparent from the following description of the preferred embodiments with reference to the attached drawings.

BRIEF DESCRIPTION OF THE DRAWINGS

FIG. 7, which is comprised of FIGS. 7A and 7B, schematically Illustrates the camera-moving directions and the divided image when an A4-size document is divided for image taking;

FIG. 8, which is comprised of FIGS. 8A and 8B, is a schematic view illustrating the operation of dividing a landscape-positioned A4-size document into four portions and inputting them;

FIGS. 10A, 10B, 11A and 11B comprise a flow chart of an embodiment of the present invention.

DETAILED DESCRIPTION OF THE PREFERRED EMBODIMENT

Figure 1:
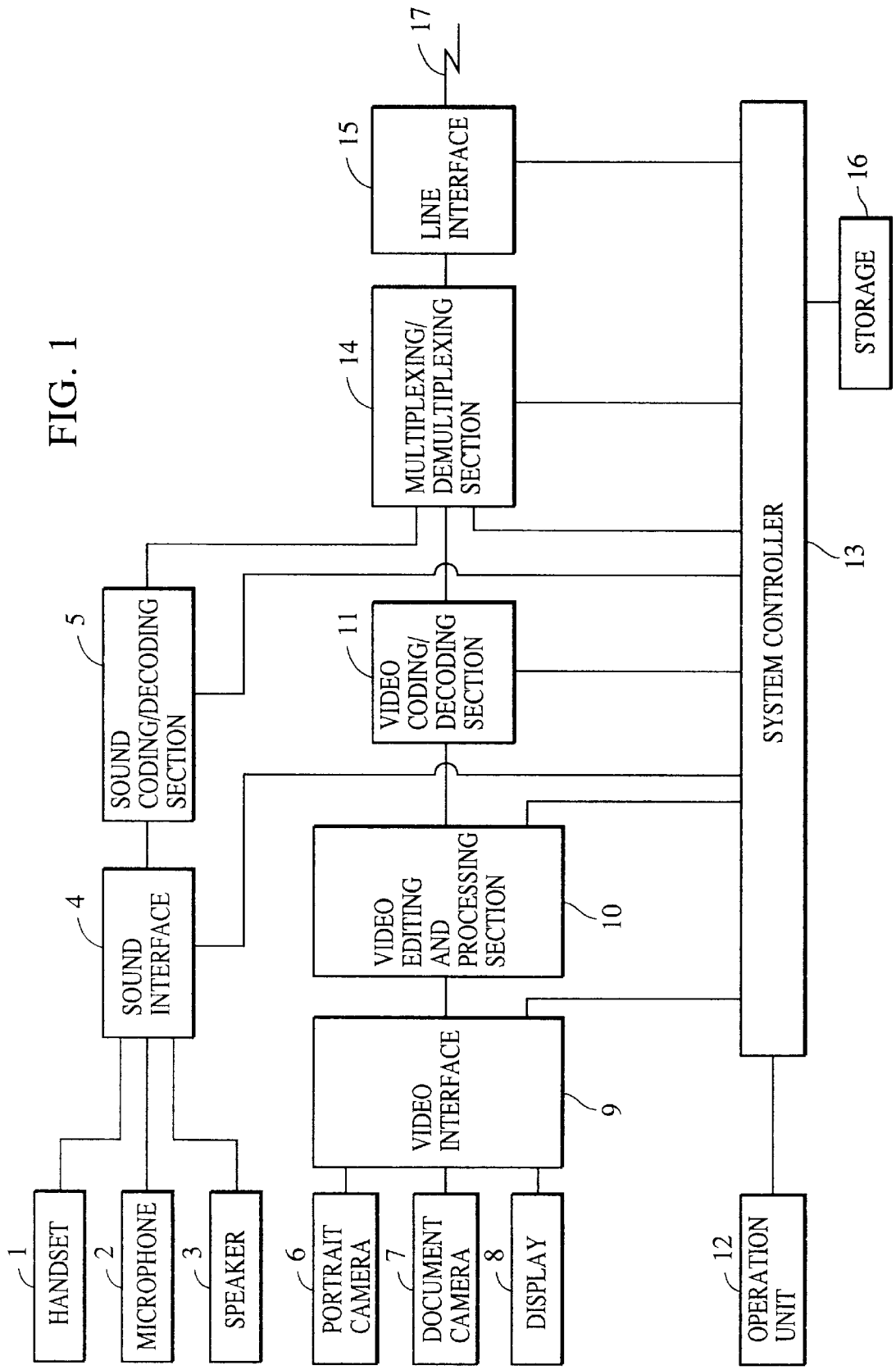
FIG. 1 is a block diagram of a video-image communication apparatus according to an embodiment of the present invention.

A preferred embodiment of the present invention will now be described with reference to the drawings. FIG. 1 is a block diagram of the schematic construction of a videoconference system formed by the application of a communication apparatus according to an embodiment of the present invention. The system includes a hand-set 1, which is one of sound input means of this apparatus, a microphone 2, which is another sound input means, and a speaker 3, which is one of sound output means of this apparatus, a sound interface 4, and a sound coding/decoding section 5. The sound interface 4 executes the following types of processing under an instruction of a system controller 13: switching between the input and the output of sound data of the handset 1, the microphone 2, and the speaker 3, all of which are used as the sound input/output means as described above, detecting as to whether the handset 1 is in the on/off hook state, canceling an echo when both of the microphone 2 and the speaker 3 are used as the sound input/output means, and generating various tones, such as dial tones, call tones, busy tones, incoming tones, etc. The sound coding/decoding section 5 encodes a transmitting sound signal and decodes a receiving sound signal under an instruction of the system controller 13 according to sound signal coding/decoding algorithms, such as 64 kbps PCM A-law/$\mu$-law, 64 kbps/56 kbps/48 kbps SB-ADPCM, 16 kbps LD-CELP, and the like. A portrait camera 6, serving as one of image input means of the apparatus, is used for inputting portrait images and the like. A document camera 7, serving as another image input means, is used for inputting original documents, and so on. A display section 8 displays images input from the portrait camera 6 or the document camera 7, images received from a. receiving end, operation frames, common frames, etc. A video interface 9 switches among the image input means and also switches the display among input images, received images, operation frames and the common frames, under an instruction from the system controller 13. A video editing and processing section 10 performs the following types of processing: mirror-image processing of video images input from the portrait camera 6, synthesizing divided images input from the document camera 7, detecting specific video images while images are input, synthesizing received images and input images, and overlaying images on graphic data, such as operation frames, pointing information, etc., instructed from the system controller 13. A video coding/decoding section 11 encodes transmitting images according to coding algorithms, such as ITU-T recommendation H. 261, and decodes receiving images. An operation unit 12 is formed of a mouse, a touch panel & a digitizer, a trackball, and so on, for controlling a keyboard and a pointing device through which control information, used for executing overall control of the apparatus, and the various data are input and generated. A system controller 13, including a CPU, a ROM, a RAM, and the like, monitors the states of the respective elements so as to control the overall apparatus, generates operation/display frames according to the states, and runs application programs. A multiplexing/demultiplexing section 14 converts a control command to a bit-rate allocation signal (BAS) code in compliance with the ITU-T recommendation and multiplexes the BAS code, a sound signal from the sound coding/decoding section 5, a video signal from the video coding/decoding section 11, and a data signal from the system controller 13 into a unit of a transmitting frame according to algorithms, such as ITU-T recommendation H. 221. The multiplexing/demultiplexing section 14 also demultiplexes a receiving frame into the above-described elements and transmits them to the sound coding/decoding section 5, the video coding/decoding section 11 and the system controller 13, respectively. A line/circuit interface section 15 controls lines and circuits according to interfaces, such as ISDN user and network interfaces/PSTN modem interfaces, by transmitting and receiving commands with the system controller 13. A storage device 16, such as a hard disk (HD), stores various control information concerning the overall apparatus, receiving/transmitting sound information and video information/documents that have been input in advance, etc. storage device 16 also indicates a line/circuit, such as ISDN/PSTN/LAN, connected to the apparatus.

Figure 2:
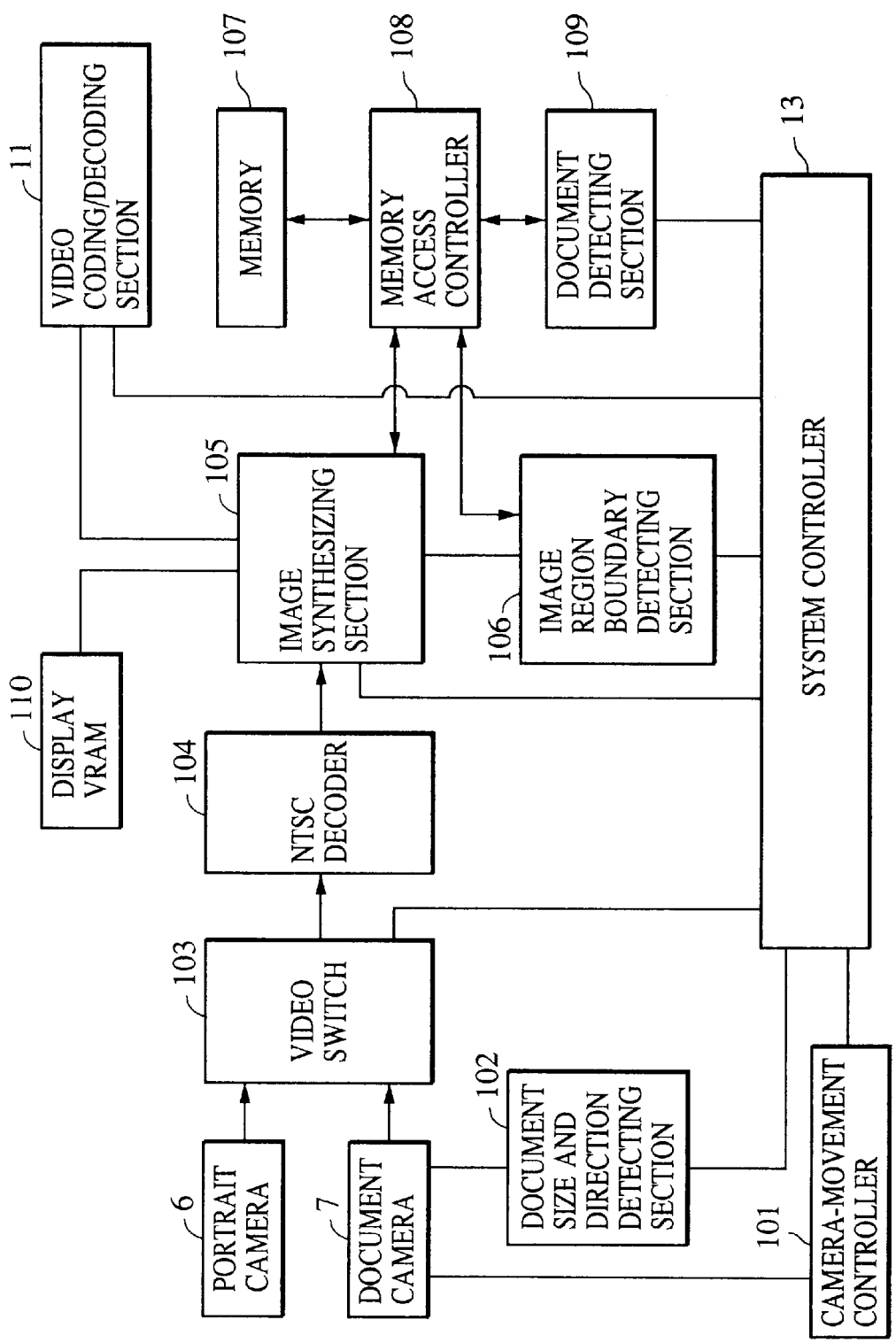
FIG. 2 is a block diagram illustrating the function of a video-image input and processing portion.

FIG. 2 is a block diagram illustrating the function of a video input portion that inputs images from the portrait camera 6 or the document camera 7 and a video editing portion according to an embodiment,of the present invention. A camera-movement controller 101 performs and controls the operation of panning and tilting, a zoom, and the like of the document camera 7 pursuant to instructions from the system controller 13. A document size and direction detecting section 102 detects the size and the direction (orientation) of a document placed on a document camera table and notifies the system controller 13 of the detection results. A video switch 103 switches between the document camera 7 and the portrait camera 6 under the control of the system controller 13. An NTSC decoder 104 samples and digitizes analog NTSC video signals input from the camera 6 or 7. An image synthesizing section 105 stores the video signals digitized by the NTSC decoder 104 in a memory 107 via a memory access controller 108 and then synthesizes various images, for example, overlaying the divided input images on each other. An image region boundary detecting section 106 detects the boundary guide indicating the image region by referring to the input divided images. The memory 107 stores the digitized images and is also used for image dividing and rewriting and synthesizing divided images, which will be described in greater detail below. The memory access controller 108 controls accesses, such as writing to and reading from the memory 107. A document detecting section 109 determines by comparing images input from the document camera 7 by a unit of frames as to whether a document is placed on the table, and also detects the changing of documents by the movement of the document set on the table. Then, the document detecting section 109 informs the system controller of the detection results. A display VRAM 110 is used for displaying the digitized images onto the display 8. Although the portrait camera 6 and the document camera 7 are explained separately for convenience of simple representation, the same camera may be employed to take images of portraits and documents by changing the modes. In such a case, the video switch 103 may be used as an input mode change-over switch, and a high-speed video processor, or the like, may be used for the image synthesizing section 105, the image region boundary detecting section 106, and the document detecting section 109 to execute the above types of processing based on software.

Figure 3:
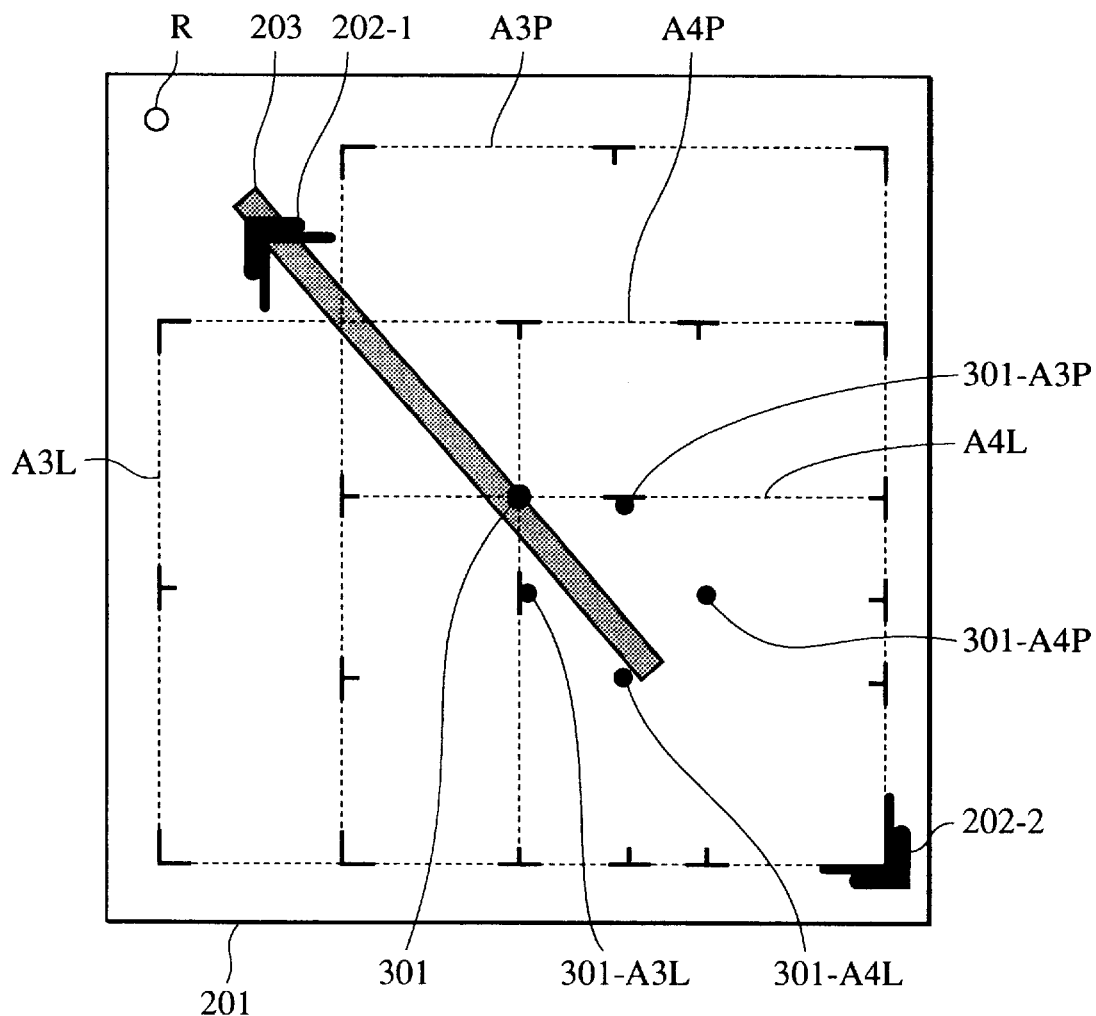
FIG. 3 illustrates a document table for a document camera on which a document is placed.
Figure 4:
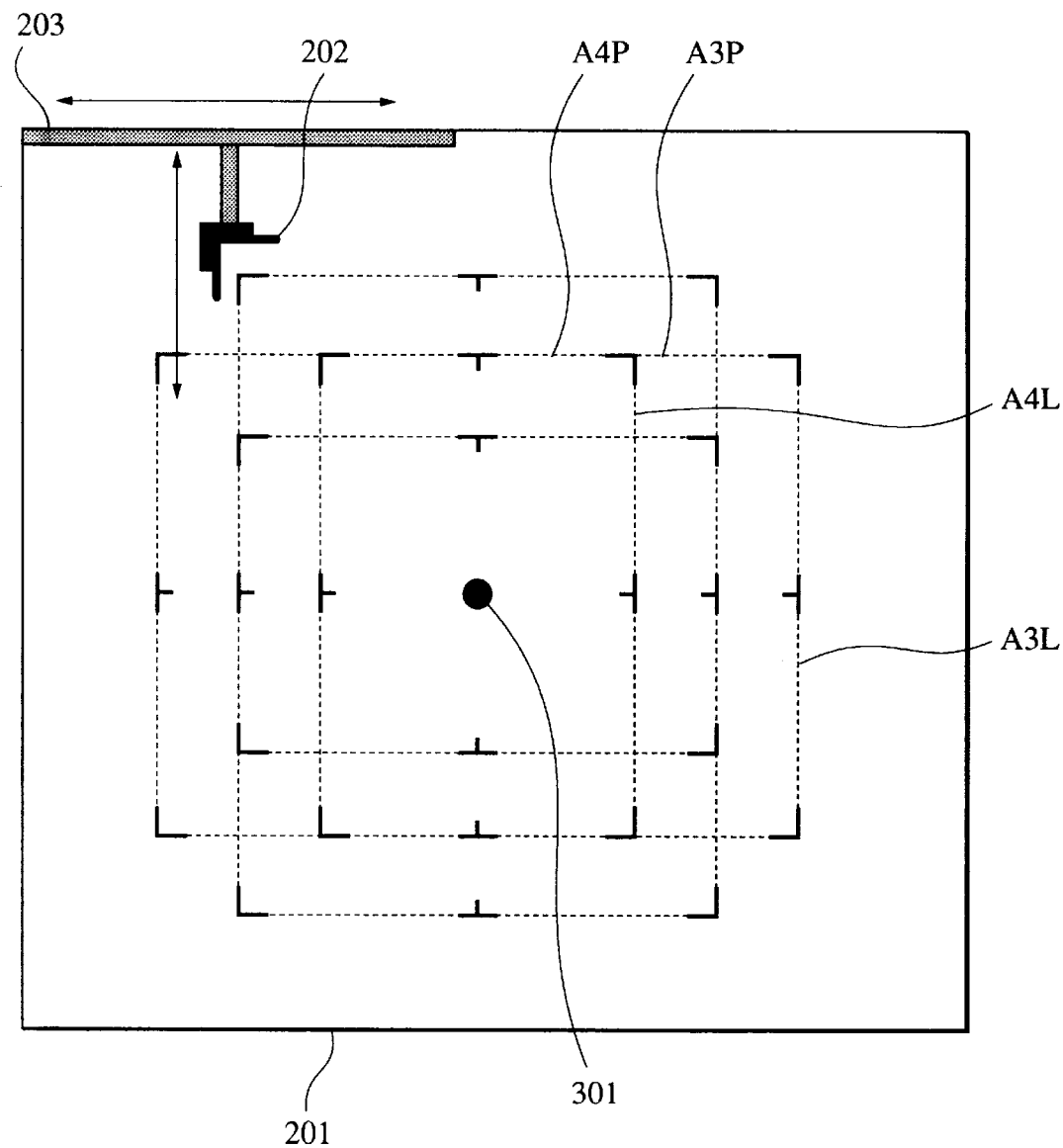
FIG. 4 illustrates a document table for a document camera on which a document is placed.

FIGS. 3 and 4 schematically illustrate a document table 201 attached to the document camera 7. The document table 201 is colored in, for example, black, which is different from the colors (white, cream, etc.) that are commonly used for documents. This makes it possible to detect the presence or the absence of a document and the movement of a document by identifying its color during the below-described document detection.

Referring to FIG. 3, document guides 202-1 and 202-2 serve to fix a document and to detect the size and the direction of a document. A slide 203 serves to slide the document guide 202-1. 301 indicates the center point of the document table 201. R designates a lamp, which will be described below. 301-A4P, 301-A4L, 301-A3P and 301-A3L represent the center points of an A4-size document in a portrait position, an A4-size document in a landscape position, an A3-size document in a portrait position, an A3-size document in a landscape position, respectively, all of such documents being placed relative to the document guide 202-2. In contrast, FIG. 4 illustrates the document table 201 on which the documents are located, not relative to the document guide 202-2, but based on the same center regardless of the types of the documents (A4, A3).

Figure 5:
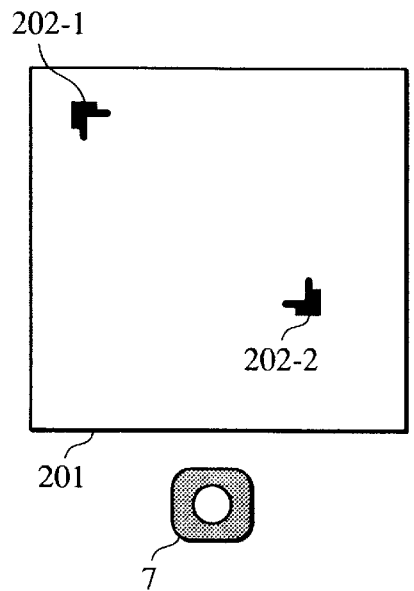
FIGS. 5(1) to 5(4) are schematic views illustrating the operation in which a document is placed on and removed from the document table.
Figure 5:
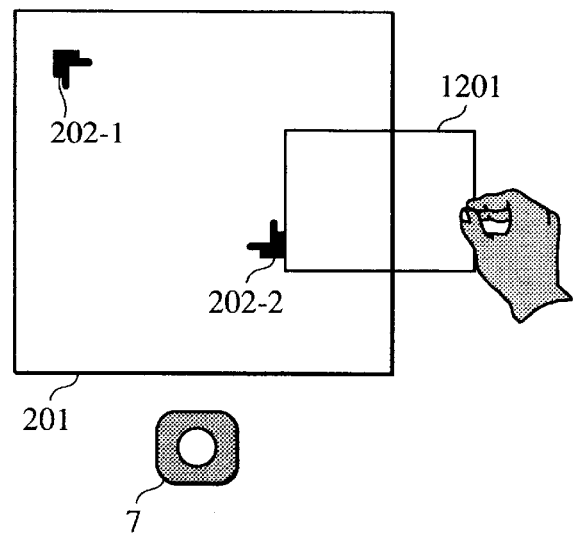
Figure 5:
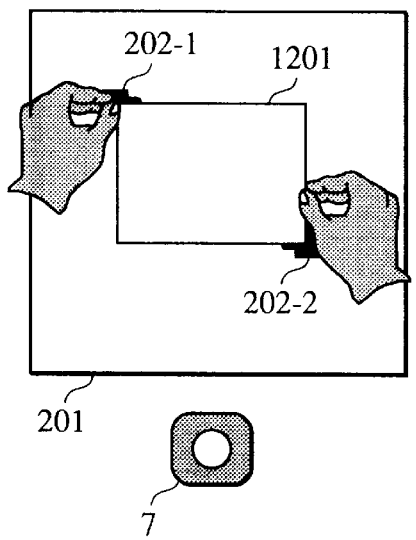
Figure 5:
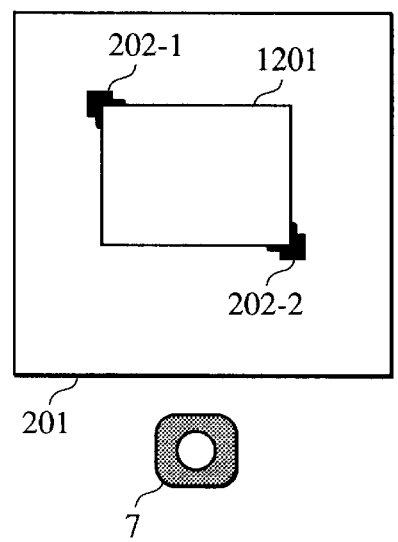
Figure 6:
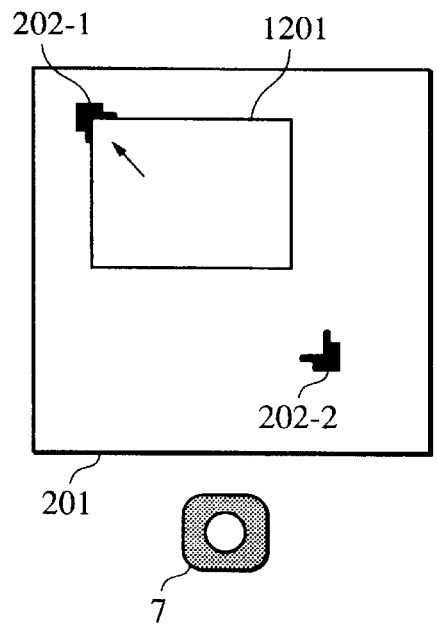
FIGS. 6(1) to 6(4) are schematic views illustrating the operation in which a document is placed on and removed from the document table.
Figure 6:
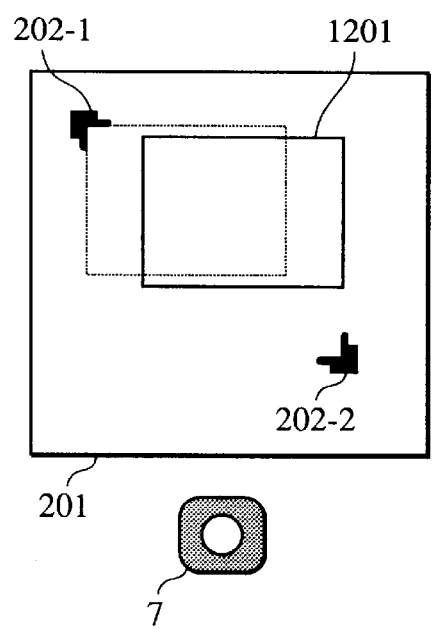
Figure 6:
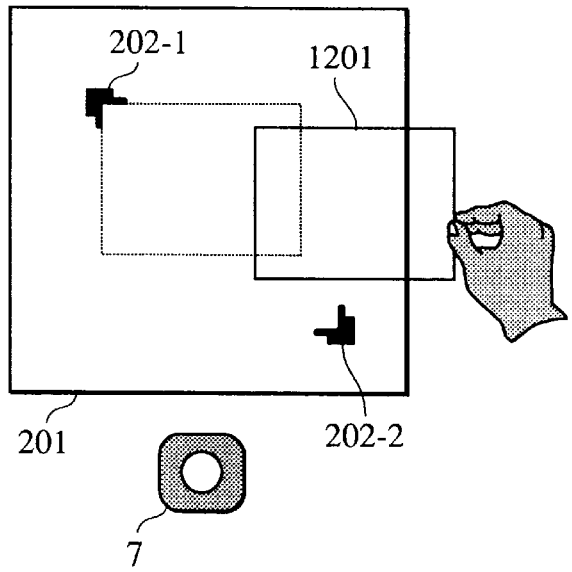
Figure 6:
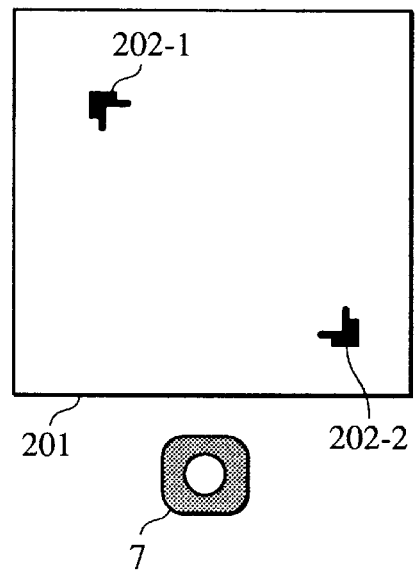

FIGS. 5(1) through 5(4), and 6(1) through 6(4) schematically illustrate the operations of placing a document on the document table 201 and removing it from the table 201. FIGS. 5(1) through 5(4) illustrate the operation of locating an A3-size document on the document table 201 by way of example. Intiallily, there is no document on the table 201; FIG. 5(1). The user prepares an A3-size document 1201; FIG. 5(2). The document 1201 is placed on the table 201 while being adjusted to the document guide 202-2; FIG. 5(3), and the guide 202-1 diagonally located to the document guide 202-2 is adjusted to the document 1201; FIG. 5(4). FIGS. 6(1)through 6(4) illustrate the operation of removing the document from the table 201. The guide 202-2 for the document 1201 which has been set, as shown in FIG. 5(4), is shifted outwardly, as indicated by the arrow of FIG. 6(1), from the position of the guide 202-2 located when a document having the maximum size (in this embodiment, a portrait-positioned A3-size document and a landscape-positioned A3-size document) registered in the document camera 7 has been set; FIG. 6(1). The document 1201 is then removed; FIGS;. 6(2), 6(3), and 6(4).

FIGS. 7A and 7B illustrate the image pick-up operation in which an A4-size document is divided into four portions as a high-resolution image. For picking up the four divided image portions, the document camera 7 is sequentially moved as indicated by the arrows a1 through d1 so as to pick up image zones a1 through d1 (FIG. 7A). FIG. 7B illustrates the movement of the camera 7 when the document is placed in a portrait position. FIGS. 8A, 8B, 9A, and 9B schematically illustrate the operation of dividing a landscape-positioned A4-size document into four portions and capturing them into the memory 107.

A detailed description will now be given of the operation of an embodiment- of the present invention with reference to the flow chart of FIGS. 10A, 10B, 11A, and 11B. In S101, an image input is first switched to the document camera 7 in response to an input from the operation unlit 12. This switching operation information is conveyed the operator by a lamp R located at the end of the document table 201. Then, in S102, the document detecting section 109 starts to detect the presence of the document while the image is input. In S103, the document is set on the camera table 201, and the documert guides 202-1 and 202-2 are adjusted to the document. It is then determined in S104 as to whether the document is detected while being monitored. If the answer is yes, the flow proceeds to S105 in which it is determined as to whether the movement of the detected document is stopped while the document is monitored by the document detecting section 109 every time an image is captured. If the answer is no, the processing is suspended until the movement is stopped. More specifically, upon comparison between input images by a unit of frames for every predetermined duration, it is determined whether a white or cream-colored zone, i.e., a document zone, is detected, and also, it is determined whether or not the document is moved relative to the document table which is colored differently from the document. If the document is found to be stopped in S105, the flow proceeds to S106 in which a timer located within the system controller 13 is started. In S107, a question is then asked again after a lapse of a predetermined duration as to whether the movement of the document is stopped. If the answer is yes, a query is further made after a lapse of a predetermined duration in S108 as to whether the timer started in S108 has ceased. If the document is found to be moving while being monitored by the timer in S107, the flow returns to S105 in which the processing is suspended until the movement of the document is stopped. If it is determined in S108 that the document has been still for a predetermined duration, the flow proceeds to S109 at which the size and the direction (orientation) of the document is detected by the document size and direction section 102. For performing document detection in S104, all of the frames, or the frames at regular intervals, may be monitored, according to the 30 frames per second of the NTSC system or according to the 25 frames per second of the PAL system. The same applies to the movement of the document. A question is then asked in S110 whether the document is A4 size in a landscape position. If the answer is yes, the flow proceeds to S111 at which the camera is shifted to a direction suitable for picking up an image of the landscape-positioned A4-size document.

Subsequently, in S112, the focus and the zoom of the camera for the image pick-up region suitable for dividing and inputting the above-described document are determined. In S113, in order to pick up an image in a zone a1 for dividing the landscape-positioned A4-size document, as shown in FIG. 7A, a control signal is sent to the document camera 7 from the system controller 13 based on camera control information (camera focus, pan, tilt, etc.) that has been registered in the storage device 16. In response to this control signal, in order to pick up an image of the zcne a1 of a first reading frame, the document camera 7 performs panning and tilting to match the camera focus to the point 401-1, and also adjusts the zoom to match the overall image pick-up region to the zone al. It should be noted that the above-described camera control information has been registered in the storage device 16 according to the sizes of the documents, such as the standard sizes, e.g. A3, A4 and A5 documents, in portrait and landscape positions.

Figure 9A:
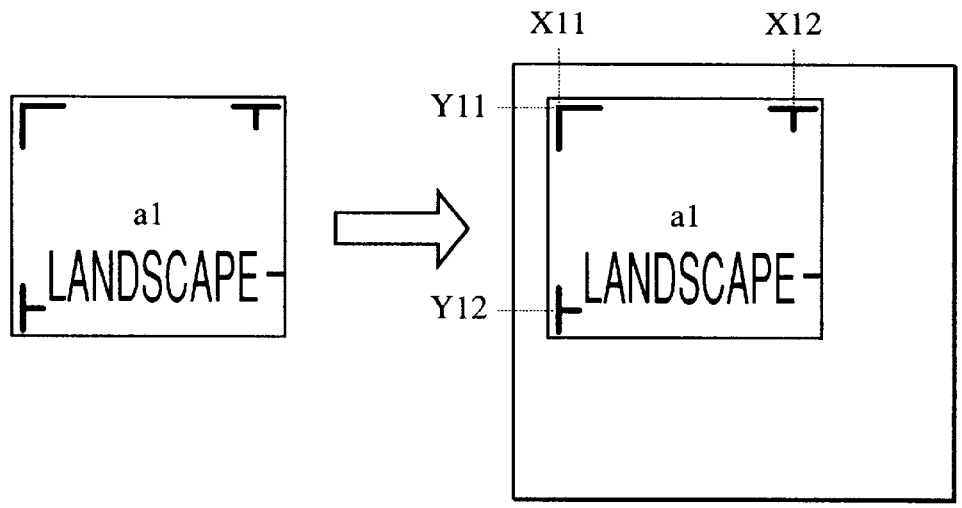
FIG. 9, which is comprised of FIGS. 9A and 9B, is a schematic view illustrating the operation of dividing a landscape-positioned A4-size document into four portions and synthesizing them in a memory.
Figure 9B:
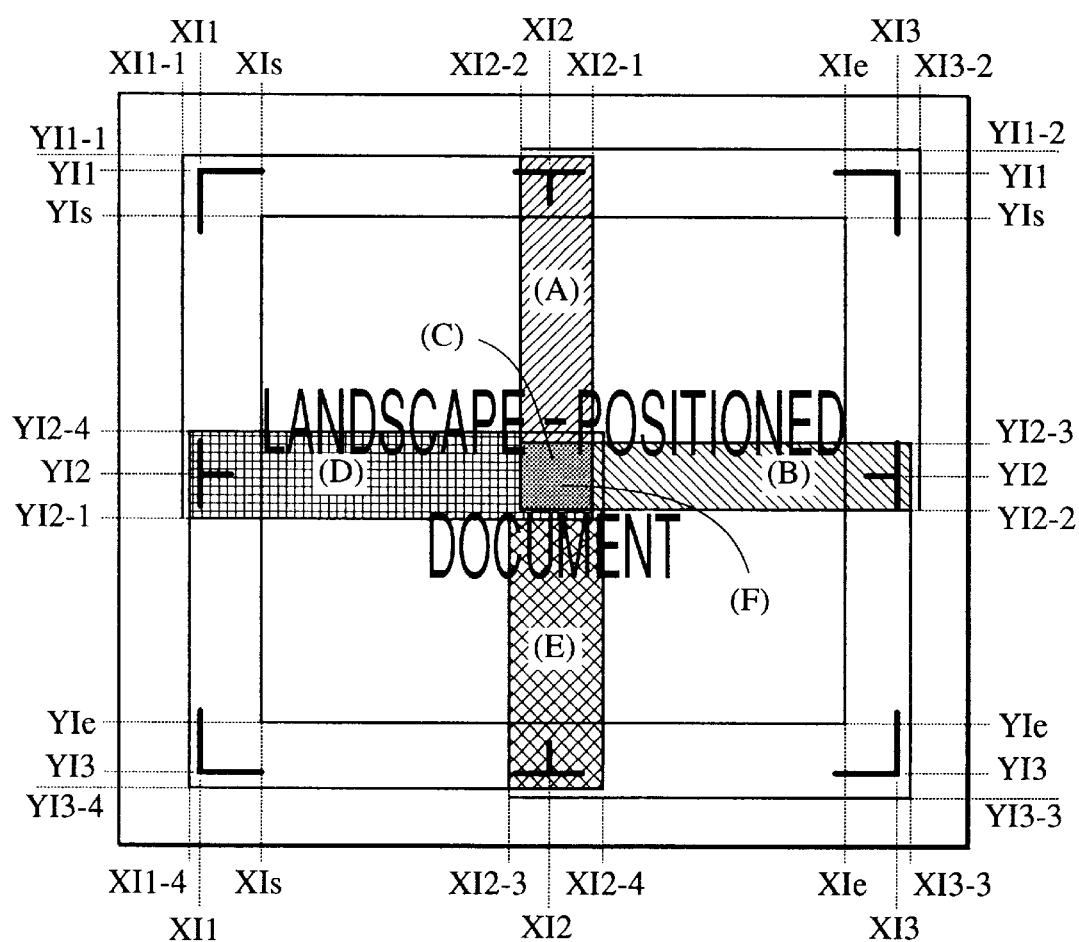
Figure 10B:
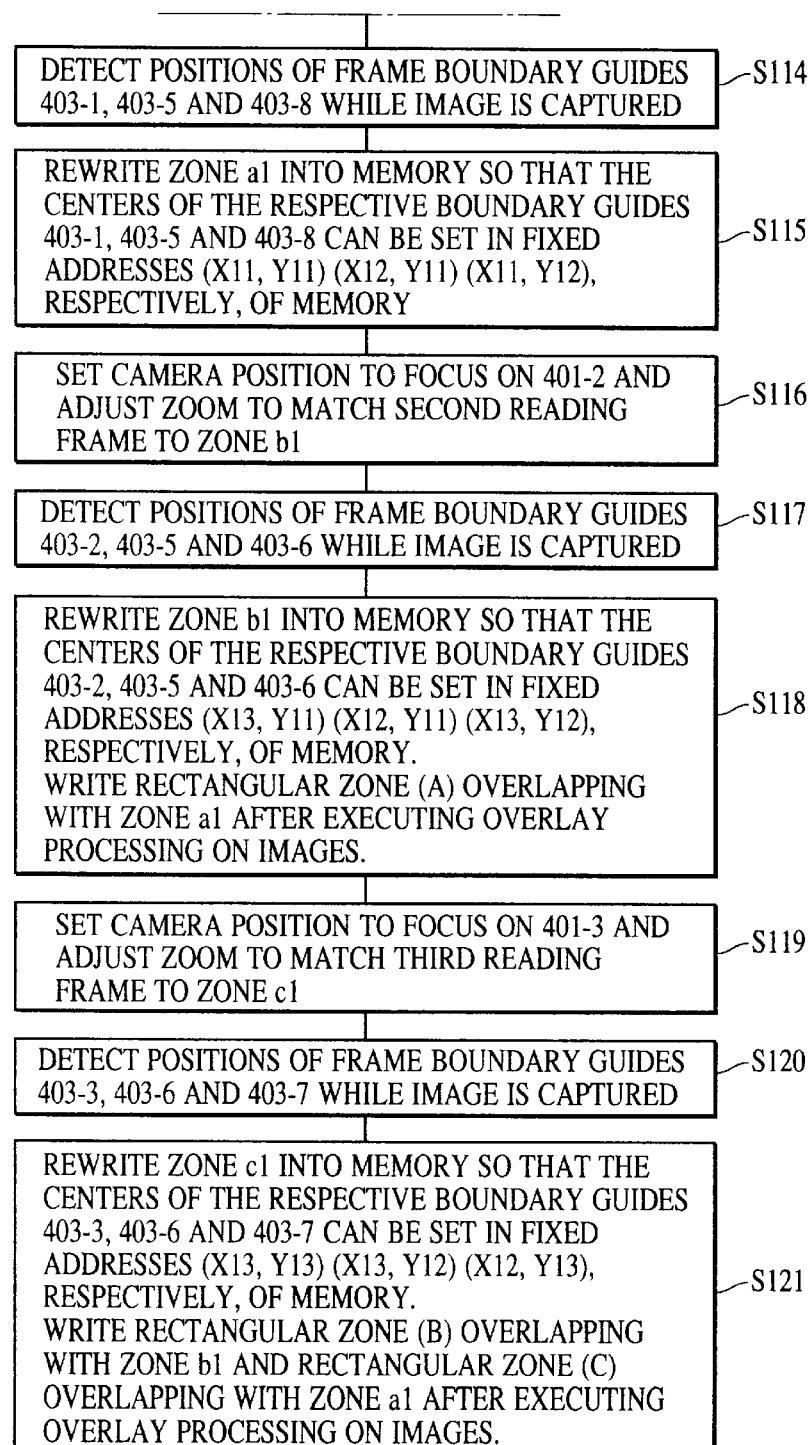
Figures 11, 11A:
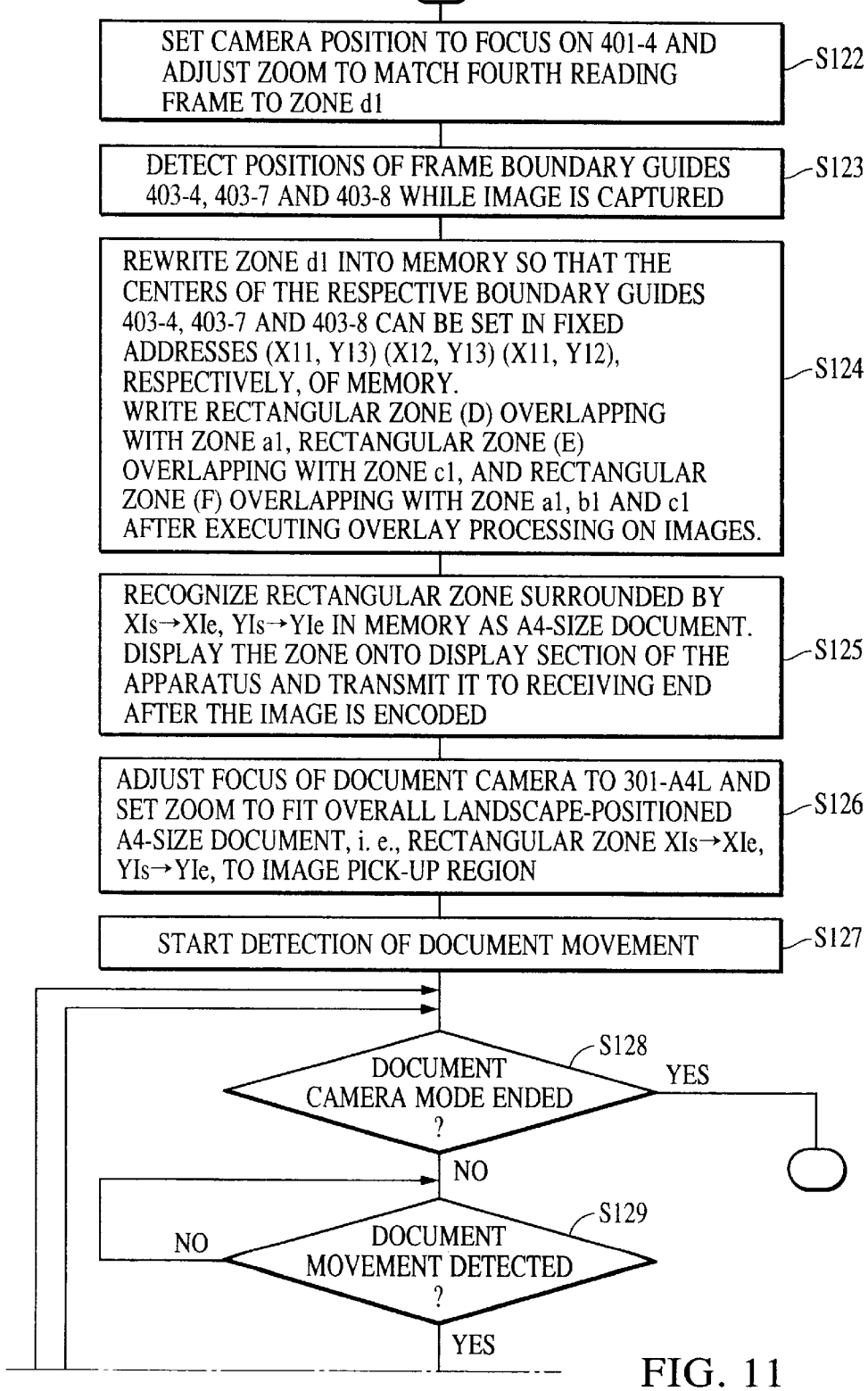
Figure 11B:
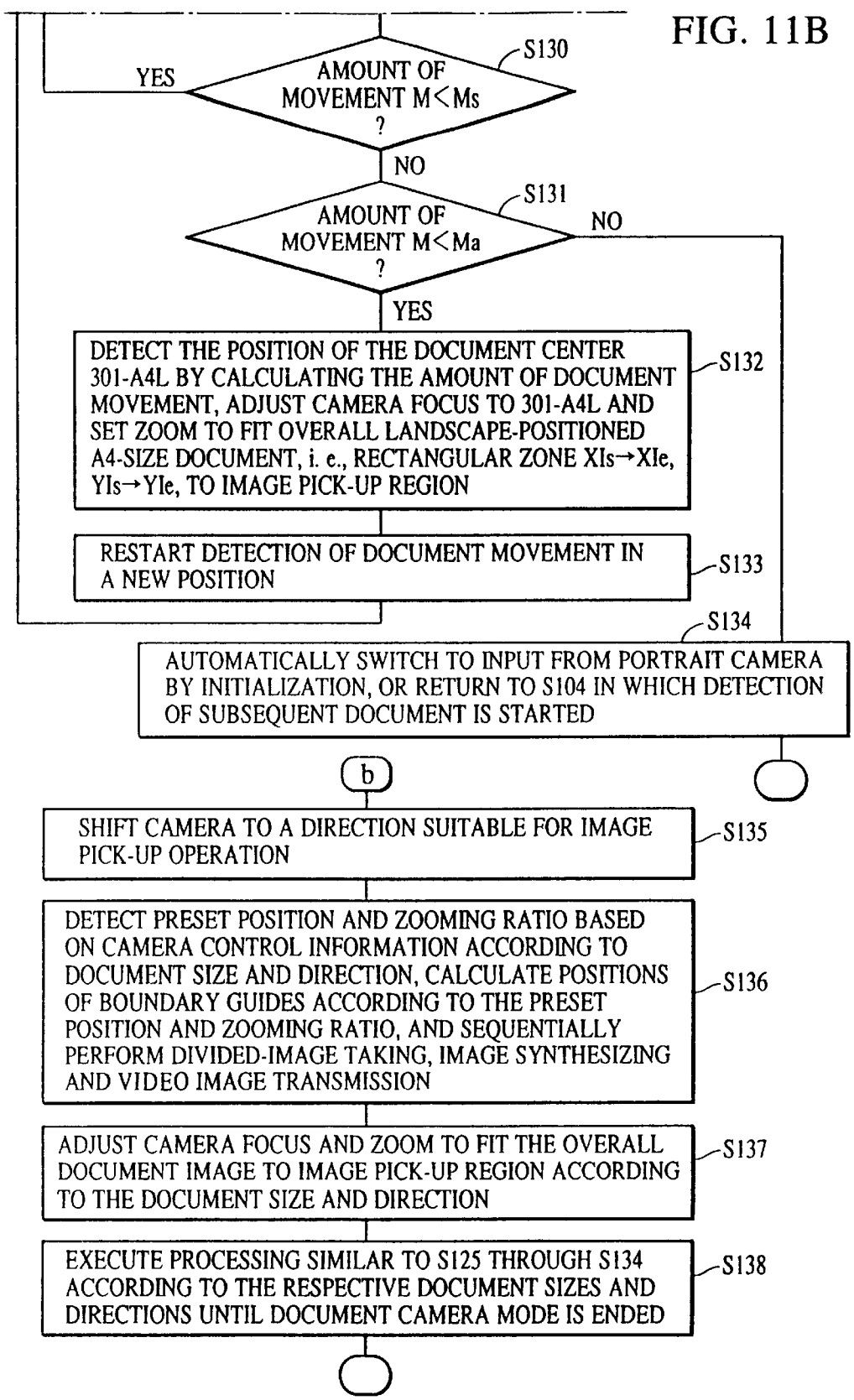

Thereafter, in S114, an image of the zone a1 is captured into the image memory 107, and also, the images of divided image boundary guides 403-1, 403-5 and 403-8 shown in FIG. 8A are detected by the image boundary detecting section 106. The guides 403-1, 403-5 and 403-8 can be detected by their specific color. The positions of the guides 403-1, 403-5 and 403-8 are notified to the image synthesizing section 105. In S115, the image synthesizing section 105 receives instructions, such as the document size, the document direction, the first frame, and the memory writ:Lng address, and so on, from the system controller 13, and rewrites the image zone a1 into the memory 107 so that the respective boundary guides 403-1, 403-5 and 40-38 can be set in the fixed addresses of the memory 107. More specifically, as is shown in FIG. 9B illustrating the arrangement of the image zone a1 stored in the memory 107, the image synthesizing section 105 rewrites the image zone a1 into the memory 107 via the memory access controller 108 after performing a converting operation as required so that the centers of the boundary guides 403-1, 403-5 and 403-8 can be located at the addresses (X11,Y11), (X12,Y11), and (X11, Y12), respectively, of the memory 107.

The flow Further proceeds to S116. For picking up an image of the zone b1 of a second reading frame, in a manner similar to S113, the document camera 7 performs, according to the camera control information, panning and tilting to match the camera focus to the point 401-2, and also adjusts the zoom to match the overall image pick-up region to the zone b1. Subsequently, in S117, the image of the zone b1 is incorporated into the memory 107, and the colored portion of divided image boundary guides 403-2, 403-5 ard 403-6 are detected by the image boundary detecting section 106. In S118, the image synthesizing section 105 receives the information concerning the positions of the guides 403-2, 403-5 and 403-6, and rewrites, based on the memory writing address information of the second frame, the image zone b1 so that the respective boundary zone guides 403-2, 403-5 and 403-6 can be set in the fixed addresses of the memory 107. More specifically, the image synthesizing section 105 rewrites the image zone b1 into the memory 107 via the memory access controller 108 after performing a converting operation as required so that the centers of the boundary guides 403-2, 403-5 and 403-6 can be located at the addresses (X13, Y11, (X12, Y11) and (X13, Y12), respectively, of the memory 107. Further, a rectangular zone (A) containing the boundary guide 403-5 shown in FIG. 9B overlaps with the image zone a1 captured in the memory 107. Accordingly, the image synthesizing section 105 writes the image zone b1 into the memory 107 after overlaying the above-described rectangular zone (A) on the image zone a1. Thereafter, in S119, in a manner similar to S113, for picking up an image of the zone c1 of a third reading frame, the document camera 7 performs, according to the camera control information, panning and tilting to match the camera focus to the center 401-3, and also adjusts the zoom to match the overall image pick-up region to the zone c1.

Then, in S120, an image of the zone c1 is incorporated into the memory 107, and the colored portion of divided image boundary guides 403-3, 403-6 and 403-7 is detected by the image boundary detecting section 106. In S121, the image synthesizing section 105 receives the information about the positions of the guides 403-3, 403-6 and 403-7, and rewrites, based on the memory writing address information of a third frame, the image zone c1 so that the respective boundary guides 403-3, 403-6 and 403-7 can be set in the fixed addresses of the memory 107. More specifically, the image synthesizing section 105 rewrites the image zone c1 into the memory 107 via the memory access controller 108 after performing a converting operation as required so that the centers of the boundary guides 403-3, 403-6 and 403-7 can be located at the addresses (X13, Y13), (X13, Y12) and (X12, Y13), respectively, of the memory 107. As shown in FIG. 9B, a rectangular zone (B) containing the boundary guide 403-6 overlaps with the image zone b1 captured in the memory 107, and a rectangular zone (C) overlaps with the image zone a1 captured in the memory 107. Accordingly, the image synthesizing section 105 writes the image zone c1 into the memory 107 after overlaying the above-described rectangular zones (B) and (C) on the image zones b1 and a1, respectively.

Further, in S122, for picking up an image of the zone d1 of a fourth reading frame, which is the final frame for reading the landscape-posit oned A4-size document, the document camera 7 performs panning and tilting to match the camera focus to the point 401-4, and the zoom is adjusted to match the overall image pick-up region to the zone d1.

Then, in S123, an image of the zone d1 is captured into the memory 107, and the colored portion of divided image boundary guides 403-4, 403-7 and 403-8 is detected by the image boundary detecting section 106. In S124, the image synthesizing section 105 receives the information concerning the positions of the guides 403-4, 403-7 and 403-8, and rewrites, based on the memory writing address information of a fourth frame, the image zone d1 so that the respective boundary zone guides 403-4, 403-7 and 403-8 can be set in the fixed addresses of the memory 107. More specifically, the image synthesizing section 105 rewrites the image zone d1 into the memory 107 via the memory access controller 108 after performing a converting operation as required so that the centers of the boundary guides 403-4, 403-7 and 403-8 can be located at the addresses (X11, Y13), (X12, Y13) and (X11, Y12) respectively, of the memory 107. As shown in FIG. 9B, a rectangular zone (D) containing the boundary guide 403-8 overlaps with the image zone a1 captured in the memory 107, a rectangular zone (E) including the guide 403-7 overlaps with the image zone c1 also captured in the memory 107, and a rectangular zone (F) overlaps with the image zones a1 through c1 in the memory 107. Accordingly, the image synthesizing section 105 writes the image zone d1 into the memory 107 after performing overlay processing on the above-described rectangular zones (D) through (F).

Then, the flow proceeds to S125. In S125, the image zone (X1s, X1e) (Y1E., Y1e), which has been stored in the storage 16 and instructed by the image synthesizing section 105, is extracted from the rectangular image zone (X11, X13) (Y11, Y13) that has been stored in the memory 107 after being divided into four portions and synthesized, and that is surrounded by the respective boundary guides. The image zone (X1s, X1e) (Y1s, Y1e) is then transferred to the display VRAM 110 and is displayed onto the display 8 as a still image whose size equals the actual landscape-positioned A4-size document. The resulting image is further coded in the video coding/decoding section 11 and then transmitted to a receiving end as a still image. As a consequence, only required data can be transmitted as a highly-compressed image without having to transmit an unnecessary image which cannot be highly compressed according to the interframe and intra-frame coding methods while the document is still prepared for the image input operation, i.e., before the document becomes still.

Subsequently, in S126, the system controller,13 gives an instruction to cause the camera movement controller 101 to adjust the focus of the document camera 7 to the point 301-A4L. The system controller 13 also causes the camera movement controller 101 to set the zoom according to the above-described camera control information so that the overall landscape-positioned A4-size document, i.e., the rectangular portion (X1s-→X1e, Y1s-→Y1e) shown in FIG. 9B, can fit the overall image pick-up zone. The movement of the document is started to be monitored in S127. A question is then asked in S128 whether the document camera mode has ended. If the answer is no, the flow proceeds to S129 in which it is determined whether the movement of the document has been detected. If the answer is no, the flow is suspended until the movement of the document is detected by the document detecting section 109. Then, it is determined in S130 as to whether the amount of document movement M detected in S130 is smaller than a predetermined amount of movement Ms. If the answer is yes, the amount M is determined to be within an allowance, and the flow returns to S128 in which the monitoring of the document movement is continued in the current position. If the detected amount of movement M is found to be not smaller than the predetermined amount Ms in S130, the flow proceeds to S131 in which a query is further made whether the amount of movement M is smaller than a predetermined amount of movement Ma. If the answer is yes, it is determined that the document has been moved only slightly on the document table. The flow further proceeds to S132 in which the amount of document movement M is calculated, and also, the center of the document 301-A4L is calculated to shift the focus of the camera to the point 301-4L. Moreover, the zoom region is adjusted to the overall image pick-up region of the document. During the above-described adjustment operation, there is no change in the document to be transmitted by the operator at all, and thus, the image data of the document is not transmitted.

Thereafter, the detection of the movement of the document placed in a new position is restarted in S133. If the amount of the detected movement M is found to be equal to or greater than the predetermined amount of movement Ma, it is determined that the document has been removed from the table. The flow then proceeds to S134 in which the input is switched to the portrait camera 6, as is initially set up by the operator. Alternatively, the flow returns to S104 in which the detection of a subsequent document is started. Alternatively, it may be initially set up in the following manner: when a document is removed from the document table, the detection of a subsequent document may be performed for a predetermined duration, and if the document is not detected after a lapse of the predetermined duration, the input may be switched to the portrait camera 6. In S126, the focus and the zoom region of the camera are adjusted to pick up an image of the overall document region. Alternatively, however, the image pick-up operation may be performed on the overall document table, in which case, the focus of the camera may be adjusted to the point 301, and the zoom may be regulated to match the image pick-up region to the overall document table 201. This modification eliminates the need for the operations in S132 and S133.

If the document detected in S110 is of a size other than the landscape-positioned A4 size, the flow proceeds to S135 in which the camera is shifted in a direction suitable for the image pick-up operation of the detected size and direction of the document. Further, in S136, divided-image taking, image synthesizing, and video image transmission are performed according to the document size and the document direction. Subsequently, in S137, the focus and the zoom of the camera are adjusted to match the overall image pick-up region of the document. In S138, processing steps similar to S125 to S134 are taken with the utse of corresponding parameters of the document size and the direction.

Although the above-described embodiment has been applied to a videoconference system by way of example, this is not exclusive. Instead, the embodiment may be applicable to various systems in which document images are input from a camera and then transmitted.

In this embodiment, a currently-used inexpensive camera that can exhibit only low resolution when document images are picked up and that outputs ordinary television video signals according to, for example, the NTSC or PAL system, is used for inputting images to output them as high-resolution images. However, this embodiment may also be applicable to a higher-resolution camera, such as a digital camera, which has a resolution of, for example, 1.6 million pixels, though at present it is still expensive. For example, if a camera having a resolution as high as four times that of currently-used cameras is employed, the resolution for reading A4-size documents, as high as 200 dpi in terms of a facsimile machine, can be obtained. It is thus possible to implement an image communication apparatus which is easily handled, reads documents with a resolution close to a scanner, and which also communicates in real time.

As will be clearly understood from the foregoing description, the above-described embodiment offers the following advantages.

A displacement of an input document image is detected. If such a displacement is smaller than a predetermined amount, the image processing apparatus determines the input conditions of the input means and, based on these conditions, inputs the document image. This eliminates the need for complicated operations and enables a high quality of the image input operation to be achieved.

Also, document displacement continues to be detected for a predetermined duration. The image input is performed only when the document displacement is found to be small after a lapse of the predetermined duration. This prevents the inputting of images inadvertently while a document is still being prepared for the image input operation. As a result, a high quality of the image input operation can be ensured. Further, since a document image is divided into portions and then input, a resultant image with high resolution can be acquired.

Even after the document image is input, the amount of movement of the image continues to be detected. This makes it possible to recognize the changing of documents, thereby enhancing ease of operation.

The present invention may be applicable to a system comprising a plurality of devices (for example, a host computer, an interface device, a reader, a printer, etc.) or to a system having a single (device (for example, a copying machine or a facsimile machine).

For rendering the various devices operable in order to implement the above-described embodiment, a software program code may be supplied to a computer within the apparatus or the system connected to the various devices. Thus, the devices may be operable according to the program stored in the computer (a CPU or an MPU) within the system or the apparatus.

In the above case, since the software program code itself enables the above(e-described embodiment to be implemented, the present invention comprises the program code and means for supplying the program code to the computer, for example, a storage medium for storing the program code therein.

Storage mediums for storing the program code include, for example, a floppy disk, a hard disk, an optical disk, a magneto-optical disk, a CD-ROM, magnetic tape, a non-volatile memory card, a ROM, and so on.

Additionally, the program code used for implementing the above-described embodiment may be included in the embodiment not only in the case where the computer runs the program code, but also in the case where the program code cooperates with an operating system (OS) running in the computer or with other application software or the like.

The program code may be supplied to the computer and may further be stored in a memory loaded with a feature extension board for the computer or with a feature extension unit connected to the computer. Then, a CPU or the like loaded with the feature extension board or the feature extension unit may completely or partially execute processing based on instructions of the program code so as to implement the embodiment.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:

image input means for detecting a document and for inputting a document image in accordance with input conditions of said image input means;

detection means for detecting displacement of the document detected by said image input means for a predetermined period of time;

determination means for determining when the displacement of the document detected by said detection means for the predetermined period of time is not greater than a predetermined value, and for determining input conditions of said image input means when the displacement detected by said detection means is not greater than the predetermined value; and control means for controlling said image input means to input the document image in accordance with the input conditions determined by said determination means when said determination means determines that the displacement of the document detected by said detection means for the predetermined period of time is not greater than the predetermined value.

2. An image processing apparatus according to claim 1, wherein said image input means comprises a camera, and the input conditions include at least an amount of zoom control of said camera.

3. An image processing apparatus according to claim 1, wherein said image input means comprises a camera, and the input conditions include at least an amount of panning control of said camera.

4. An image processing apparatus according to claim 1, wherein said image input means comprises a camera, and the input conditions include at least an amount of tilting control of said camera.

5. An image processing apparatus according to claim 1, wherein said image input means comprises a camera, and the input conditions include at least an amount of direction of orientation control of said camera with respect to the document image.

6. An image processing apparatus according to claim 1, wherein said image input means divides the document image into plural document image portions, and inputs the plural document image portions.

7. An image processing apparatus according to claim 6, further comprising synthesizing means for synthesizing the plural document image portions.

8. An image processing apparatus according to claim 1, further comprising coding means for coding the document image input by said image input means, and transmission means for transmitting document image information coded by said coding means to an external device.

9. An image processing apparatus according to claim 1, wherein said control means controls said image input means to correct the input conditions of said image input means after the document image has been detected by said image input means if said control means determines that the displacement of the document image detected by said detector means is correctable by correcting the input conditions of said image input means.

10. An image processing apparatus according to claim 1, wherein said control means controls said image input means to re-input a document image previously input by said image input means if the displacement of the document image detected by said detection means for the predetermined period of time is not correctable by correcting the input conditions of said image input means.

11. An image processing system comprising:

a transmitting terminal comprising:

image input means for detecting a document and for inputting a document image in accordance with input conditions of said image input means;

detection means for detecting displacement of the document detected by said input means for a predetermined period of time;

determination means for determining when the displacement of the document detected by said detection means for the predetermined period of time is not greater than a predetermined value, and for determining input conditions of said image input means when the displacement of the document detected by said detection means is not greater than the predetermined value;

control means for controlling said image input means to input the document image in accordance with the input conditions determined by said determination means when said determination means determines that the displacement of the document detected by said detection means for the predetermined period of time is not greater than the predetermined value;

coding means for coding the document image input by said image input means; and transmission means for transmitting a coded document image coded by said coding means to an external device; and a receiving terminal comprising:

decoding means for decoding a coded document image received from said transmitting terminal; and display means for displaying a document image decoded by said decoding means.

12. An image processing system according to claim 11, wherein said transmitting terminal further comprises sound input means for inputting sound information, multiplexing the coded document image with the sound information, and transmitting multiplexed sound and coded document data, and wherein said decoding means of said receiving terminal comprises means for demultiplexing the multiplexed sound and coded document image data.

13. An image processing system according to claim 11, wherein said image processing system comprises a videoconference system.

14. An image processing method comprising the steps of:

detecting a document and inputting a document image in an image input means in accordance with input conditions of the image input means;

detecting desplacement of the document detected in the image input means for a predetermined period of time;

determining when the displacement of the document detected by the displacement detecting step for the predetermined period of time is not greater than a predetermined value, and for determining input conditions of the image input means when the displacement detected in said displacement detecting step is not greater than the predetermined value; and controlling the image input means to input the document image in accordance with the input conditions determined in the determining step when the determining step determines that the displacement of the document detected in the displacement detecting step for the predetermined period of time is not greater than the predetermined value.

15. An image processing method according to claim 14, wherein the image input means includes a camera, and the input conditions include at least an amount of zoom control of the camera.

16. An image processing method according to claim 14, wherein said image input means includes a camera, and the input conditions include at least an amount of panning control of the camera.

17. An image processing method according to claim 14, wherein the image input means includes a camera, and the input conditions include at least an amount of tilting control of the camera.

18. An image processing method according to claim 14, wherein the image input means includes a camera, and the input conditions include at least an amount of direction of orientation control of the camera with respect to the document image.

19. An image processing method according to claim 14, wherein in inputting the document image, the image input means divides the document image into plural document image portions, and inputs the plural document image portions.

20. An image processing method according to claim 19, further comprising the step of synthesizing the plural document image portions.

21. An image processing method according to claim 14, further comprising the step of coding the document image input by the image input means, and a step of transmitting document image information coded by the coding step to an external device.

22. An image processing method according to claim 14, wherein the control step controls the image input means to correct the input conditions of the image input means after the document image has been detected in the document image inputting step by said image input means if it is determined in the control step that the displacement of the document image detected in the displacement detection step is correctable by correcting the input conditions of the image input means.

23. An image processing method according to claim 14, wherein the control step controls the image input means to re-input a document image previously input in the document image inputting if the displacement of the document image detected in the displacement detection step for the predetermined period of time is not correctable by correcting the input conditions of the image input means.

24. A computer usable medium having computer readable program code units for image processing embodied therein comprising:

a first program code unit for detecting a document and inputting a document image in an image input means in accordance with input conditions of the image input means;

a second program code unit for detecting displacement of the document detected in the image input means for a predetermined period of time;

a third program code unit for determining when the displacement of the document detected by the displacement detecting for the predetermined period of time in the second program code unit is not greater than a predetermined value, and for determining input conditions of the image input means when the displacement detected in said displacement detecting in the second program code unit is not greater than the predetermined value; and a fourth program code unit for controlling the image input means to input the document image in accordance with the input conditions determined by the third program code unit when it is detemined that the displacement of the document for the predetermined period of time detected by the second program code unit is not greater than the predetermined value.

25. A computer usable medium having computer readable program code units for image processing embodied therein according to claim 24, wherein the image input means includes a camera, and the input conditions include at least an amount of zoom control of the camera.

26. A computer usable medium having computer readable program code units for image processing embodied therein according to claim 24, wherein said image input means includes a camera, and the input conditions include at least an amount of panning control of the camera.

27. A computer usable medium having computer readable program code units for image processing embodied therein according to claim 24, wherein the image input means includes a camera, and the input conditions include at least an amount of tilting control of the camera.

28. A computer usable medium having computer readable program code units for image processing embodied therein according to claim 24, wherein the image input means includes a camera, and the input conditions include at least an amount of direction orientation control of the camera with respect to the document image.

29. A computer usable medium having computer readable program code units for image processing embodied therein according to claim 24, wherein in inputting the image document by the first program code unit, the image input means divides the document image into plural document image portions, and inputs the plural document image portions.

30. A computer usable medium having computer readable program code units for image processing embodied therein according to claim 29, further comprising a fifth program code unit for synthesizing the plural document image portions.

31. A computer usable medium having computer readable program code units for image processing embodied therein according to claim 24, further comprising a sixth program code unit for coding the document image input by the image input means, and a seventh program code unit for transmitting document image information coded by the sixth program code unit to an external device.

32. A computer usable medium having computer readable program code units for image processing embodied therein according to claim 24, wherein the controlling of the fourth program code unit controls the image input means to correct the input conditions of the image input means after the document image has been detected by said image input means according to the first program code unit if it is determined by the fourth program code unit that the displacement of the document image detected by the displacement detecting of the second program code unit is correctable by correcting the input conditions of the image input means.

33. A computer usable medium having computer readable program code units for image processing embodied therein according to claim 24, wherein the fourth program code unit controls the image input means to re-print a document image previously input in the document image inputting of the first program code unit if the displacement of the document image detected in the displacement detecting for the predetermined period of time of the second program code unit is not correctable by correcting the input conditions of the image input means.

* * * * *

UNITED STATES PATENT AND TRADEMARK OFFICE
CERTIFICATE OF CORRECTION

PATENT NO. : 6,144,403
DATED : November 7, 2000
INVENTOR(S) : Masatoshi Otani

It is certified that error appears in the above-identified patent and that said Letters Patent is hereby corrected as shown below:

Column 1,
Line 27, "videoteplliones" should read -- videotelephones --;
Line 38, "ITIJ-T" should read -- ITU-T --;
Line 62, "that ;sections" should read -- that sections --; and
Line 66, "realizy" should read -- reality --.

Column 2,
Line 39, "obtained only" should read -- obtained. Only --.

Column 4,
Line 54, "Illustrates" should read -- illustrates --.

Column 5,
Line 8, "hand-set 1," should read -- handset 1, --; and
Line 34, "a." should read -- a --.

Column 6,
Line 16, "embodiment, of" should read -- embodiment of --.

Column 7,
Line 24, "FIGS. 6(1) through" should read -- FIGS. 6(1) through --;
Line 33, "FIGS;." should read -- FIGS. --;
Line 46, "embodiment-" should read -- embodiment --;
Line 50, "unlit" should read -- unit --;
Line 51, "conveyed" should read -- conveyed to --; and
Line 56, "documert" should read -- document --.

Column 8,
Line 55, "writ:Ling" should read -- writing --; and
Line 58, "40-38" should read -- 403-8 --.

Column 9,
Line 1, "Further" should read -- further --;
Line 21, "Y11," should read -- Y11), --; and
Line 61, "landscape-posit oned" should read -- landscape-positioned --.

Column 10,
Line 24, "(YlE., Yle)," should read -- (Yls, Yle), --; and
Line 43, "controller, 13" should read -- controller 13 --.

UNITED STATES PATENT AND TRADEMARK OFFICE
CERTIFICATE OF CORRECTION

PATENT NO. : 6,144,403
DATED : November 7, 2000
INVENTOR(S) : Masatoshi Otani

It is certified that error appears in the above-identified patent and that said Letters Patent is hereby corrected as shown below:

Column 11,
Line 44, "utse" should read -- use --.

Column 12,
Line 28, "(device" should read -- device --; and
Line 39, "above (e-described" should read -- above-described --.

Signed and Sealed this

Twenty-fifth Day of December, 2001

*Attest:*

JAMES E. ROGAN
*Director of the United States Patent and Trademark Office*

*Attesting Officer*